United States Patent [19]

Turcotte et al.

[11] Patent Number: 5,330,670

[45] Date of Patent: * Jul. 19, 1994

[54] GLYCOL-BASED POLYCARBOXYLATE-CONTAINING ANTIFREEZE COOLANT FORMULATIONS

[75] Inventors: David E. Turcotte, Woodhaven; John J. Conville, Canton; James T. Lyon, Novi; Richard J. Holland, Grosse Ille; Stanley T. Hirozawa, Birmingham, all of Mich.

[73] Assignee: BASF Corporation, Parsippany, N.J.

[*] Notice: The portion of the term of this patent subsequent to Feb. 22, 2011 has been disclaimed.

[21] Appl. No.: 734,653

[22] Filed: Jul. 23, 1991

[51] Int. Cl.$^5$ ............................................. C09K 5/00
[52] U.S. Cl. ........................................ 252/76; 252/79
[58] Field of Search ................................. 252/76, 79

[56] References Cited

U.S. PATENT DOCUMENTS 3,278,585  10/1966  Baker et al. ............................ 252/79

Primary Examiner—Christine Skane
Attorney, Agent, or Firm—Nixon & Vanderhye

[57] ABSTRACT

The present invention provides an antifreeze/coolant composition with polymeric polycarboxylates which prevents hard water precipitants and scale formation, is soluble in alcohol and alcohol/water mixtures, is compatible with other commonly used antifreeze/coolant components, does not corrode or damage automotive cooling systems and is effective at relatively low concentrations.

8 Claims, No Drawings

GLYCOL-BASED POLYCARBOXYLATE-CONTAINING ANTIFREEZE COOLANT FORMULATIONS

BACKGROUND OF THE INVENTION

1. Field of the Invention

This invention relates to antifreeze/coolant compositions and more specifically to antifreeze/coolant compositions with polycarboxylates.

2. Description of the Prior Art

Antifreeze/coolant technology in North America uses silicate as a corrosion inhibitor. Silicates are particularly useful in protecting aluminum automotive cooling system components. The silicate corrosion inhibitors generally also use a phosphate, usually in the form of an alkali metal salt, to help protect metal cooling system parts and also as a buffer to control the pH of the coolant.

Often phosphate salts are used to help maintain a stable alkaline environment from which multiple corrosion inhibitors can most effectively function. Thus, the degradation of silicate and phosphate in an antifreeze/coolant can negatively impact the overall performance of the antifreeze/coolant.

Traditionally antifreeze/coolant is sold at nearly one-hundred percent glycol content. This concentrated packaging allows for flexibility so that the user can dilute the antifreeze/coolant, as needed, with available water to obtain the required freeze/boil protection. However, corrosion protection is needed over the entire dilution range.

Recently, there has been an increase in concern over the quality of water used to dilute the antifreeze/coolant. Water quality varies greatly with geographic location, population and degree of industrialization.

One of the major problems is hard water control. The U.S. Geological Survey defines hard water in parts per million of ionic calcium. Magnesium is also commonly considered to be a hardness ion. Moderately hard water is from 25 to 50 ppm and hard water is defined as 50 to 75 ppm. Very hard water is considered to be above 75 ppm. At below 25 ppm, the soft water designation is used.

When a typical North American antifreeze/coolant containing silicate and phosphate is mixed with very hard water, copious precipitates develop in a short period of time. Hard water salts can cause maintenance and operations difficulties at automotive manufacturing facilities. These precipitates may clog an automotive cooling system, resulting in reduced coolant flow, increased engine operating temperatures and shorter service life. These precipitates may circulate through the entire cooling system promoting erosion and wear, e.g. water pump damage through increased cavitation and seal abrasion.

The presence of hard water and antifreeze/coolant in an automotive cooling system may also lead to scale formation. The scales can be formed from alkaline earth metal carbonate and phosphate deposition. These inorganic films tend to inhibit thermal transfer and thus reduce the efficiency of the cooling system. Inhibiting scale formation has long been a concern in aqueous cooling systems. For, example, U.S. Pat. No. 3,663,448 discloses scale inhibition for industrial cooling waters using amino phosphonate and polyacrylic acid compounds. U.S. Pat. No. 3,948,792 discloses an aqueous additive mixture to reduce and modify the amount of silicate scale formed in automotive cooling systems.

In addition to the thermal, abrasive and physical problems presented by hard water precipitates, their chemical formation depletes the initial antifreeze/coolant. The hard water precipitates comprise silicate and phosphate salts. By reducing the available quantity of these corrosion inhibitors, the ability of the resultant liquid antifreeze/coolant to provide adequate corrosion protection, particularly for aluminum, is uncertain. The result is dependent upon the hardness of the water used and the initial silicate concentration of the antifreeze/coolant.

In Europe, hard water is more prevalent than in North America. European antifreeze/coolant technology, while commonly using silicate corrosion inhibitors, differs from that of North America in that the technology concentrates on reduction of silicate precipitation. European patent 245557 discloses the use of a variety of compounds including sodium polyacrylate to prevent alkaline earth metal silicate precipitation. However, in this patent phosphate is not used as a buffer in the coolant, thus simplifying the precipitation issue.

U.S. Pat. No. 4,487,712 discloses the use of polyacrylic acid as a silicate stabilizer to inhibit gelation. Gelation is a silicate depletion mechanism which occurs separately from hard water precipitation.

In spite of these disclosures, there remains a need for a concentrated silicate-phosphate type antifreeze/coolant composition which prevents hard water precipitates and deposits upon dilution with hard water.

SUMMARY OF THE INVENTION

The present invention has met the above-described need by providing an antifreeze/coolant composition with polymeric polycarboxylates which prevents hard water precipitants and scale formation, is soluble in alcohol and alcohol/water mixtures, is compatible with other commonly used antifreeze/coolant components, does not corrode or damage automotive cooling systems and is effective at relatively low concentrations.

It is an object to provide antifreeze/coolant compositions which are effective when diluted with hard water.

It is another object of the present invention to use polymeric polycarboxylates in silicate-phosphate type antifreeze/coolant compositions to reduce or eliminate hard water precipitation.

These and other objects of the present invention will be more fully understood from the following description of the invention.

DESCRIPTION OF THE PREFERRED EMBODIMENTS

The present invention provides an antifreeze/coolant composition with polymeric polycarboxylates which prevents hard water precipitants and scale formation, is soluble in alcohol and alcohol/water mixtures, is compatible with other commonly used antifreeze/coolant components, does not corrode or damage automotive cooling systems and is effective at relatively low concentrations.

The preferred class of polymeric polycarboxylates are based on polyacrylic acid (PAA) and/or polymaleic acid (PMA). These polymeric polycarboxylates are compatible with other components in the typical antifreeze/coolant composition, and present no additional toxicity or disposal concerns.

The polycarboxylates used in the present invention have a molecular weight range of from 500 to about 250,000, with a preferred range of from 500 to 12,000. More specifically, the most preferred additives have average molecular weights in the range of about 500 to 4000, and more specifically about 1300 to about 1800 and about 300 to about 4600.

When reference is made to polycarboxylates within the context of the present invention it is understood to encompass those watersoluble homo- and copolymers having at least one monomeric unit containing $C_{3-6}$ monoethylenically unsaturated mono- or dicarboxylic acids or their salts. Suitable monocarboxylic acids of this type are for example, acrylic acid, methacrylic acid, ethacrylic acid, vinylacetic acid, allylacetic acid, and crotonic acid. The preferable monocarboxylic acids from this group are acrylic acid and methacrylic acid. A further component of the polycarboxylate comprises monoethylenically unsaturated $C_{4-6}$ dicarboxylic acids, for example, maleic acid, itaconic acid, citraconic acid, mesaconic acid, fumaric acid, or methylenemalonic acid. The preferred acid is maleic acid.

Other organic substituents may be used as comonomers or as modifiers added along the polymer chain. Examples of such are shown as Formula I.

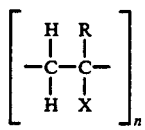

(I)

where R=H or a secondary alcohol such as isopropanol, X=COOH, COO$^-$Na$^+$, methylvinylether, isobutylene, vinyl acetate, acrylamide, or styrene, with the proviso that when R= a secondary alcohol, X=COOH or COO$^-$Na$^+$, and when X= any other above referenced group, R=H. The preferred polycarboxylates are a copolymer of acrylic acid and maleic acid, said copolymer having a molecular weight of 3000, and as sodium salt of polyacrylic acid modified with a secondary alcohol such a isopropanol, said polymer having a molecular weight of 4000.

The polycarboxylates used in the present invention are obtained by methods well known to those skilled in the art. The general method of synthesis is via free acid radical polymerization. The polymerization may be carried out in an aqueous medium, in the presence of polymerization initiators, with or without regulants. The polymerization can take various forms; for example, the monomer(s) can be polymerized batchwise in the form of aqueous solutions. It is also possible to introduce into the polymerization reactor a portion of the monomer(s) and a portion of the initiator, to heat the mixture in an inert atmosphere to the polymerization temperature and then to add the remaining monomer(s) and initiator to the reactor at the rate of polymerization. Polymerization temperatures range from 20° C. to 200° C. At temperatures above 100° C., pressure vessels are employed.

The carboxyl containing monomers can be polymerized in the free carboxylic acid form, in the partial neutralized form, or completely neutralized. The neutralization is preferably effected with alkali metal or ammonium base.

The polymerization initiators used are preferably water soluble free radical formers such as hydrogen peroxide, peroxodisulfates and mixtures of the two. The polymerization may also be started with water insoluble initiators such as dibenzoyl peroxide, dilaurylperoxide, or azodiisobutyronitrile.

The polymerization may be carried out in the presence of regulants. Examples of such regulants include water soluble mercaptans, ammonium formate, and hydroxylammonium sulfate.

Examples of the polycarboxylates which may be used in the present invention are those marketed by BASF under the trademark SOKALAN ® polycarboxylates, which are available in aqueous polymer solutions.

The polymeric polycarboxylate is effective at relatively low concentrations, generally about 100 to about 1000 ppm per total volume of antifreeze/coolant for very hard water. Generally the concentrated antifreeze/coolant is diluted about fifty percent in water. Precipitation prevention in soft water or hard water may be prevented at least about 10 to 20 ppm.

The preferred antifreeze/coolant composition is a silicate-phosphate type having about 94% antifreeze grade glycols and about 3% corrosion inhibitors, with the balance being water. While ethylene glycol is preferred in this present invention, propylene glycol or mixtures of ethylene glycol and propylene glycol may be used. The corrosion inhibitors generally are a mixture of azole compounds, nitrate salts, defoamers and other constituents in addition to the stabilized silicate and phosphate salts. The stabilized silicate technology is disclosed in U.S. Pat. Nos. 4,370,255; 4,362,644 and 4,354,002, all hereby incorporated by reference. Antifreeze/coolant compositions are well-known in the art and many variations of the above-described composition will be useful in the invention.

The following examples serve to further illustrate the present invention and should in no way be construed as limiting the scope thereof.

EXAMPLES

Materials

The central standard from Volkswagenwerk AG, Audi NSU and Auto Union AG on Coolant Testing for Silicate Stability (P-VW 1426) was used as a screening tool. The test is based on storage of a coolant with a synthetic hard water.

The composition of the synthetic hard water was made by dissolving 148 mg of sodium sulfate; 165 mg sodium chloride; 138 mg sodium bicarbonate; and 275 mg calcium chloride in 1 liter of distilled water. This synthetic water is 100 ppm in ionic calcium, and thus is considered to be very hard water.

The antifreeze/coolant used was approximately 94% antifreeze grade glycols and about 3% corrosion inhibitors. The corrosion inhibitors were stabilized silicate and phosphate salts, azole 6 compounds, nitrate salts and defoamers.

Method

The experimental method mixed 100 mls of antifreeze/coolant with an equivalent amount of synthetic hard water in a covered eight ounce glass bottle. The sample was then stored for ten days at 80° C. Following storage, the samples were removed and evaluated for precipitates. Positive and negative controls were evaluated with each set of samples.

The negative control was prepared as detailed above, and a large quantity of precipitates formed within hours of mixing, even at room temperature. Often the negative control solution was cloudy upon mixing.

The positive control was made by mixing the antifreeze/coolant with distilled water. No precipitation or clouding was noted.

After separating the precipitates from the liquors of a negative control, following the 10 day test, chemical analyses were performed to determine the chemical composition of the hard water precipitates. Infrared analysis indicated the presence of silicates and phosphates in the solids. Ion chromatography indicated that the solids were 28% phosphate in composition. Expressed as calcium phosphate, this could account for 46% of the total solids in one sample.

Energy Dispersive Spectroscopy (EDS) showed the presence of potassium, sodium, and calcium in addition to confirming the presence of phosphorous and silicon in the solid precipitates. A solid sample of hard water precipitate was 63% potassium phosphate and this was determined to be the primary constituent.

To eliminate the hard water precipitate formation, a number of materials were evaluated for their solubility in an ethylene glycol based antifreeze/coolant. If soluble, the effect of the additive versus concentration in the screening coolant was established using the hard water storage stability test. The materials evaluated in this manner are identified in Table 1 which summarizes the results obtained.

To pass the hard water storage stability test, no precipitates should be present in the bottom of the glass bottle when the sample is removed from the oven and evaluated. The clarity of the liquors is noted but not a criteria for evaluation. No suspended material or gel should be noted in a passing sample. Figures stated for concentration of additive used are at dilution with hard water and normalized for activity or concentration of additive. All solid materials are assumed pure.

TABLE 1A

| SOKALAN ® Polycarboxylates | | | |
|---|---|---|---|
| Additive Name | Chemical Comps'n | Ave. M.W. (g/mole) | Solubility Result (yes/no) |
| CP 2 | PMA/Methylvinyl-ether | 70,000 | No |
| CP 5 | PMA/PAA | 70,000 | No |
| CP 45 | PMA/PAA | 70,000 | No |
| CP 7 | PMA/PAA | 50,000 | No |
| CP 8 | PMA/PAA | 150,000 | No |
| CP 9 | PMA/Olefin | 12,000 | Yes |
| PM 10 | PMA | 1,000 | Yes |
| CP 10 | Modified PAA | 4,000 | Yes |
| CP 10 S | Modified PAA | 4,000 | Yes |
| CP 12 S | PMA/PAA | 3,000 | Yes |
| CP 13 S | Modified PAA | 20,000 | Yes |
| PA 15 | PAA | 1,200 | Yes |
| PA 20 | PAA | 2,500 | Yes |
| PA 25 PN | PAA | 4,000 | Yes |
| PA 30 | PAA | 8,000 | Yes |
| PA 40 | PAA | 15,000 | No |
| PA 50 | PAA | 30,000 | Yes |
| PA 70 | PAA | 70,000 | Yes |
| PA 75 | PAA | 76,000 | Yes |
| PA 80 S | PAA | 100,000 | Yes |
| PA 110 S | PAA | 250,000 | Yes |

TABLE 1B

| Commercially Available Polycarboxylates | | | |
|---|---|---|---|
| Additive Name | Chemical Comps'n | Ave. M.W. (g/mole) | Solubility Result (yes/no) |
| Colloid 211[1] | PAA | 3,400 | Yes |

TABLE 1B-continued

| Commercially Available Polycarboxylates | | | |
|---|---|---|---|
| Additive Name | Chemical Comps'n | Ave. M.W. (g/mole) | Solubility Result (yes/no) |
| Belclene 200[2] | PMA | 270 | Yes |
| Belclene 201 | PMA | 450 | Yes |
| Belclene 283 | PMA | 1,600 | Yes |
| Belclene 400 | Polyanionic | 4,000 | Yes |
| Belclene 500 | Phophino-carboxylic Acid | 1,300 | Yes |
| Good-rite K732[3] | PAA | 5,400 | Yes |
| Good-rite K752 | PAA | 2,000 | Yes |
| Carbopol 672[4] | PAA+ | N/A++ | No |
| Carbopol 674 | PAA+ | N/A++ | No |
| Carbopol 1610 | PAA+ | N/A++ | No |

[1]Colloid is a trade product of Colloid, Inc.
[2]Belclene is a trade product of Ciba Geigy.
[3]Carbopol is a trade product of BF Goodrich.

TABLE 1C

| Other Materials | | | |
|---|---|---|---|
| Additive Name | Chemical Comps'n | Ave. M.W. (g/mole) | Solubility Result (yes/no) |
| Sokalan ® DCS | Dicarboxylic Acid Salts | N/A | Yes |
| Chelator | Sodium Gluconate | 218 | Yes |
| PVP | Polyvinyl-pyrrolidone | N/A | Yes | average experimentally determined by gel permeation chromatography (GPC). The parameters are as follows:

GPC Parameters:

| Column Set | 250 + 120 Ultrahydrogel at 50 degrees C. |
| Mobile Phase | 0.1M sodium phosphate buffer at pH 6.7 |
| Flow Rate | 0.6 mL/minute |
| Sample Injection | 100 micro-liters of 1 mg/ml |
| Detector | differential refractometer |
| Standards | Polyacrylic Acid Standards |

It was necessary to extrapolate from the calibration to obtain molecular weight averages for some of the lower weight Belclene additives. The results should be considered as estimates.

+ chemical composition from MSDS supplied by manufacturer.

++ not available, the average molecular weights are in the hundreds of thousands to millions based on viscosity data.

Table 1 shows that not all polycarboxylates are soluble in ethylene glycol and that solubility is not a clear function of molecular weight. The solubility also seems to be dependent upon the chemical composition.

However, Table 1 shows that generally larger molecular weight PMA/PAA copolymers are less soluble than larger molecular weight PAAs.

The extremely large molecular weight moieties, the Carbopols, were not completely soluble in ethylene glycol. Since these materials could break up during automotive cooling system use and resultant smaller components dissolve and function, it was decided to test these materials further.

Table 2 summarizes the results of the synthetic hard water storage testing for the additives.

TABLE 2A

| SOKALAN ® Polycarboxylates | | | |
|---|---|---|---|
| Additive Name | Min. Pass Level or Max. Level Tested (ppm) | Test Results | Benefit (yes/no) |
| CP 9 | 200 | Fail | No |
| PM 10 | 200 | Fail | Yes |
| CP 10 | 50 | Pass | Yes |

TABLE 2A-continued

SOKALAN ® Polycarboxylates

| Additive Name | Min. Pass Level or Max. Level Tested (ppm) | Test Results | Benefit (yes/no) |
|---|---|---|---|
| CP 10 S | 50 | Pass | Yes |
| CP 12 S | 50 | Pass | Yes |
| CP 13 S | 250 | Pass | Yes |
| PA 15 | 500 | Fail | Yes |
| PA 20 | 500 | Fail | Yes |
| PA 30 | 500 | Fail | Yes |
| PA 50 | 500 | Fail | Yes |
| PA 70 | 500 | Fail | No |
| PA 75 | 500 | Fail | No |
| PA 80 S | 250 | Pass | Yes |
| PA 110 S | 250 | Pass | Yes |

TABLE 2B

Commercially Available Polycarboxylates

| Additive Name | Min. Pass Level or Max. Level Tested (ppm) | Test Results | Benefit (yes/no) |
|---|---|---|---|
| Colloid 211 | 500 | Fail | Yes |
| Belclene 200 | 500 | Fail | Yes |
| Belclene 201 | 500 | Fail | No |
| Belclene 283 | 500 | Pass | Yes |
| Belclene 400 | 500 | Pass | Yes |
| Belclene 500 | 500 | Pass | Yes |
| Good-rite K732 | 200 | Pass | Yes |
| Good-rite K752 | 100 | Pass | Yes |
| Carbopol 672 | 300 | Fail> | No |
| Carbopol 674 | 300 | Fail> | Yes |
| Carbopol 1610 | 300 | Fail> | Yes |

TABLE 2C

Other Materials

| Additive Name | Min. Pass Level or Max. Level Tested (ppm) | Test Results | Benefit (yes/no) |
|---|---|---|---|
| Sokalan ® DCS | 2,000 | Fail | No |
| Sodium Gluconate | 20,000 | Fail | No |
| PVP | 250 | Fail | No |

>material evaluated despite incomplete solubility.

Table 2 shows that a variety of polycarboxylates are effective at allowing a silicate-phosphate based coolant to pass the synthetic hard water storage test. Although some additives strictly fail the test, they produced some clear, positive effects by reducing the amount or kind of precipitates or both. Some additives provided no ability to pass the test nor any beneficial factors to the screening coolant. In these two latter fail cases, it is possible that increasing the level of additive may provide improvement.

The most effective additives, based on minimum concentration required to pass the test, were Sokalan ® CP 10, CP 10 S and CP 12 S. The next best performers included Sokalan ® PA 20 and Good-rite K-752.

The sodium gluconate, PVP and dicarboxylic acid salts were not effective additives for hard water precipitates. The lower molecular weight distributed Belclene PMA's were only able to modify the precipitates formed. The Carbopols tested resulted in some benefit in two cases. This is surprising because they were not entirely soluble. It is speculated that complete solubility may not be necessary, but that if the portion of the additive which is very active can be solubilized, that additive will have some benefit. However, the most preferred additives are entirely soluble.

The most effective additives tested were Sokalan ® CP 10, Sokalan ® CP 10 S and Sokalan ® CP 12 S (trademark of BASF Corp., Parsippany, N.J.). S denotes the free acid form of the polycarboxylate and the absence of the S indicates a neutralized sodium salt. All free acid materials would be neutralized in the alkaline, buffered antifreeze/coolant mixture. Neutralization may affect the solubility of larger molecular weight additives.

Sokalan ® CP 10 S was chosen for further evaluation to explore its effect on the corrosion inhibitor package in the base screening coolant. Although the Sokalan ® CP 10 S containing coolant passed the storage test at the equivalent of 50 ppm, the concentration was increased to 375 ppm in order to exaggerate any concentration dependent effects and evaluated by the ASTM D1384-87 standard test method. ASTM D1384-87 is a corrosion test method for engine coolants in glassware. The changes in weight for the control antifreeze/coolant and the antifreeze/coolant with the additive (375 ppm Sokalan ® CP 10 S) are shown in Table 3. The specification required to pass ASTM D1384-87 is also given as a reference. All weight changes are in mg/coupon.

TABLE 3

| Metal Coupon | Spec. to Pass | Base Coolant | Base Coolant + Additive |
|---|---|---|---|
| Copper | −10 | −0.6 | −1.1 |
| 2006 Solder | −30 | +0.3 | −0.6 |
| Brass | −10 | −2.4 | −9.0 |
| Mild Steel | −10 | +0.6 | −0.1 |
| Cast Iron | −10 | −0.8 | −6.1 |
| Aluminum | −30 | +6.1 | +2.6 |

Table 3 shows that the addition of 375 ppm Sokalan ® CP 10 S to the screening coolant did not significantly alter the weight change results, nor the outcome of the test. Thus, the polycarboxylate additive is compatible with the corrosion inhibitors present in the antifreeze/coolant. The addition of the additive causes no further corrosion to standard cooling system metals.

Sokalan ® CP 12 S polycarboxylate was added to commercial antifreeze/coolants to evaluate its effect by the hard water stability test. Table 4 shows the results of this test. The Table shows the amount of additive required in solution for each coolant/hard water mixture to pass the storage stability test. In all cases, the commercial products mixed with the synthetic hard water with no additive failed the test.

TABLE 4

| Commercial Product Antifreeze/Coolant | Level of Sokalan ® CP 12 S Required to Pass (in ppm) |
|---|---|
| ZEREX ®[a] | 50 |
| PRESTONE II ®[b] | 100 |
| PEAK ®[c] | 50 |
| TEXACO ®[d] | 250 |

[a]ZEREX ® is a registered trademark of BASF Corp.
[b]PRESTONE II ® is a registered trademark of First Brands Corp.
[c]PEAK ® is a registered trademark of Old World Trading.
[d]TEXACO ® is a registered trademark of Texaco Oil Company.

Table 5 shows that the addition of a polycarboxylate to commercial silicate-phosphate type antifreeze/coolants provides improved formulations which do not exhibit precipitates upon mixing with very hard water. The levels of the additive required for the various commercial antifreeze/coolants were generally similar, but not identical.

Whereas particular embodiments of the invention have been described above for purposes of illustration, it will be appreciated by those skilled in the art that numerous variations of the details may be made without departing from the invention as described in the appended claims.

What is claimed is:

1. A glycol-based automotive antifreeze/coolant solution for use in hard water having silicate and phosphate salts and including a glycol-soluble polycarboxylate additive present in an amount which stabilizes the solution against hard water precipitate formation, said polycarboxylate additive being at least one of (i) a sodium salt of a copolymer of acrylic acid and maleic acid, and (ii) a secondary alcohol modified polyacrylic acid.

2. A glycol-based automotive antifreeze/coolant solution as in claim 1, wherein said polycarboxylate is a sodium salt of a secondary alcohol modified polyarcylic acid.

3. A glycol-based automotive antifreeze/coolant solution as in claim 1 or 2, wherein said polycarboxylate additive is present in an amount of about 100 to 1000 ppm per total volume of the antifreeze/coolant solution.

4. A glycol-based automotive antifreeze/coolant solution as in claim 3, wherein said polycarboxylate has a molecular weight range of from about 500 to about 250,000.

5. A glycol-based automotive antifreeze/coolant solution as in claim 1, wherein said polycarboxylate is a sodium salt of an acrylic acid/maleic acid copolymer having a molecular weight of 3000.

6. A glycol-based automotive antifreeze/coolant solution as in claim 1, wherein said polycarboxylate is a polyacrylic acid modified with an aliphatic secondary alcohol.

7. A glycol-based automotive antifreeze/coolant solution as in claim 6, wherein said polycarboxylate is a sodium salt of a polyacrylic acid modified with an aliphatic secondary alcohol having a molecular weight of 4000.

8. A glycol-based automotive antifreeze/coolant solution as in claim 6 or 7, wherein said aliphatic secondary alcohol is isopropanol.

* * * * *